(12) United States Patent
Smith

(10) Patent No.: US 7,631,067 B2
(45) Date of Patent: Dec. 8, 2009

(54) SERVER INITIATED PREDICTIVE FAILURE ANALYSIS FOR DISK DRIVES

(75) Inventor: Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1654 days.

(21) Appl. No.: 10/176,205

(22) Filed: Jun. 20, 2002

(65) Prior Publication Data
US 2004/0103337 A1 May 27, 2004

(51) Int. Cl.
G06F 15/173 (2006.01)
G06F 11/00 (2006.01)

(52) U.S. Cl. .......................... 709/224; 714/25

(58) Field of Classification Search ............... 714/2, 714/6, 7, 25, 18, 39, 47, 48, 41, 42, 44; 711/114, 711/154; 709/223, 224
See application file for complete search history.

(56) References Cited

U.S. PATENT DOCUMENTS

| | | | | |
|---|---|---|---|---|
| 5,566,316 A | * | 10/1996 | Fechner et al. | 711/114 |
| 6,076,142 A | * | 6/2000 | Corrington et al. | 711/114 |
| 6,460,151 B1 | * | 10/2002 | Warwick et al. | 714/718 |
| 6,604,211 B1 | * | 8/2003 | Heiman et al. | 714/41 |
| 2003/0061546 A1 | * | 3/2003 | Collins et al. | 714/42 |
| 2003/0074599 A1 | * | 4/2003 | Golasky et al. | 714/6 |

OTHER PUBLICATIONS

Co-pending Patent Application, "Adaptive Event-Based Predictive Failure Analysis Measurements in a Hard Disk Drive"; U.S. Appl. No. 10/023,262, filed Dec. 18, 2001.

* cited by examiner

*Primary Examiner*—Tonia L Dollinger
*Assistant Examiner*—Asghar Bilgrami
(74) *Attorney, Agent, or Firm*—James R. Nock

(57) ABSTRACT

The present invention provides a method, apparatus and program product for improving reliability in RAID/Server systems by monitoring the RAID/Server system at the system level for predictive failure analysis (PFA) triggering events. Examples of PFA triggering events include: rebuild operations, addition of new disk drives, a change in usage patterns, and suspected handling damage. Once a triggering event is detected, the RAID/Server system issues a command to the disk drives in the system to begin performing PFA. If a PFA error is detected on any of the drives, the error is reported to the RAID/Server system.

19 Claims, 3 Drawing Sheets

SERVER INITIATED PREDICTIVE FAILURE ANALYSIS FOR DISK DRIVES

FIELD OF THE INVENTION

The present invention relates generally to computer systems, and more specifically to disk drives used for mass storage of data in computer systems.

CO-PENDING RELATED APPLICATIONS

The present invention is related to co-pending application, Ser. No. 10/023,262, filed Dec. 18, 2001, entitled "Adaptive Event-Based Predictive Failure Analysis Measurements in a Hard Disk Drive", both applications having a common inventor/assignee.

BACKGROUND OF THE INVENTION

Disk drives are well known components of computer systems. Advances in disk drive technology have led to substantial increases in storage capacity, increased disk rotation speeds, and lower head flying heights. With these advances, there has been an increased need to detect conditions that may indicate that a head crash is imminent.

Detection of such so-called "pre-crash" conditions is referred to as "predictive failure analysis" or PFA. Conventional predictive failure analysis involves measuring a number of operating parameters of the disk drive, including head flying height, hard error rates, soft error rates, vibration, and disk run out checks, and comparing such parameters with predetermined thresholds. When a failure is indicated or confirmed by PFA, a warning may be issued to a host computer so that suitable preventative measures may be taken, such as transferring data from the disk drive and/or replacing the disk drive.

Disk drives are increasingly used cooperatively in groups, clusters or arrangements of multiple drives. In one such arrangement, RAID (Redundant Array of Independent Disks) is a set of methods and algorithms for combining multiple disk drives (i.e., a storage array) as a group in which attributes of the multiple drives are better than the individual disk drives. RAID can be used to improve data integrity (i.e., reduce the risk of losing data due to a defective or failing disk drive), cost, and/or performance.

RAID was initially developed to improve I/O performance at a time when computer CPU speed and memory size was growing exponentially. The basic idea was to combine several small inexpensive disks (with many spindles) and stripe the data (i.e., split the data across multiple drives), such that reads or writes could be done in parallel. To simplify the I/O management, a dedicated controller would be used to facilitate the striping and present these multiple drives to the host computer (e.g., server) as one logical drive.

The problem with this approach was that the small, inexpensive PC disk drives of the time were far less reliable than the larger, more expensive drives they replaced. An artifact of striping data over multiple drives is that if one drive fails, all data on the other drives is rendered unusable. To compound this problem, by combining several drives together, the probability of at least one drive out of the group failing increased dramatically.

In order to overcome this pitfall, extra drives were added to the RAID group to store redundant information. In this way, if one drive failed, another drive within the group would contain the missing information, which could then be used to regenerate the lost information. Since all of the information was still available, the end user would never be impacted with down time and the rebuild could be done in the background. If users requested information that had not already been rebuilt, the data could be reconstructed on the fly and the end user would not know about it.

Today there are six base architectures (levels) of RAID, ranging from "Level 0 RAID" to "Level 5 RAID". These levels provide alternative ways of achieving storage fault tolerance, increased I/O performance and true scalability. Three main building blocks are used in all RAID architectures: 1) Data Striping—Data from the host computer is broken up into smaller chunks and distributed to multiple drives within a RAID array. Each drive's storage space is partitioned into stripes. The stripes are interleaved such that the logical storage unit is made up of alternating stripes from each drive. Major benefits are improved I/O performance and the ability to create large logical volumes. Data striping is used in Level 0 RAID. 2) Mirroring—Data from the host computer is duplicated on a block-to-block basis across two disks. If one disk drive fails, the data remains available on the other disk. Mirroring is used in RAID levels 1 and 1+0. 3) Parity—Data from the host computer is written to multiple drives. One or more drives are assigned to store parity information. In the event of a disk failure, parity information is combined with the remaining data to regenerate the missing information. Parity is used in RAID levels 3, 4 and 5.

If a drive fails in a RAID array that includes redundancy—meaning all RAID architectures with the exception of RAID 0—it is desirable to get the drive replaced immediately so the array can be returned to normal operation. There are two reasons for this: fault tolerance and performance. If the drive is running in a degraded mode due to a drive failure, until the drive is replaced, most RAID levels will be running with no fault protection at all: a RAID 1 array is reduced to a single drive, and a RAID 3 or RAID 5 array becomes equivalent to a RAID 0 array in terms of fault tolerance. At the same time, the performance of the array will be reduced, sometimes substantially.

Typically, PFA is performed on drives within a RAID/Server system at regular time intervals, such as every four hours. Typically, each drive performs PFA measurements at this interval, but the phase of the intervals is different for each drive. This may be done deliberately in order to avoid all drives performing PFA measurements and calculations at the same time which might reduce system performance.

While this technique, also known as PFA interval phase skew, is good for RAID/Server system performance, there are situations where it works against reliability. For example, it would be desirable to perform PFA for all drives in a RAID at the same time just prior to a rebuild operation. A rebuild operation is performed whenever a drive fails and the drive that replaces it needs to be written with new data. Rebuilds typically take 2-3 hours but can take longer under high usage conditions. If a second drive fails during the rebuild process, the customer loses all of the data on the RAID, which can be more than 200 gigabytes of data. Thus, performing PFA on all drives prior to a rebuild decreases the probability of a second drive failure while the rebuild process is taking place. A second kind of data loss that can occur during the rebuild operation is a "strip data loss". A strip data loss results from an unrecovered read error during rebuild, and typically involves the loss of 64 KB or 128 KB of data.

In addition to forcing PFA prior to a RAID rebuild, it would also be desirable to force a PFA before and/or after the RAID/Server system is physically moved to a new location. A forced PFA would also be useful if the RAID/Server system is suspected to be damaged or the RAID/Server system's usage pattern has undergone a change (e.g., the unit has not been in use or has seen only light use, and is now planned for heavy use). In all of these instances, it is necessary for the PFA to be initiated at the system level, rather than at the drive itself.

Present systems all perform PFA at a drive-level rather than a system-level of operation. These PFAs are typically performed either on an automatic semi-periodic basis as described previously (e.g., every 4 hours) or are triggered by a specific event on the drive itself during normal operation. Ser. No. 10/023,262, filed Dec. 18, 2001, entitled "Adaptive Event-Based Predictive Failure Analysis Measurements in a Hard Disk Drive", describes one drive-level initiated PFA scheme. In this instance, a trigger event within the drive is detected, and, in response to the detected trigger event, a predictive failure analysis is performed with respect to the disk drive hardware. Examples of drive-level trigger events include increases in media/servo error rates, temperature/humidity readings that are outside of a normal operating range, a load/unload event, and a start-stop event.

It would be desirable to provide RAID/System server-initiated PFA measurements driven off of server-initiated events. Such server-initiated events include RAID rebuild operations, RAID usage, addition of a new or used RAID unit to an existing server system, suspect handling damage to a RAID unit, or a change in usage pattern of a particular RAID unit. The details of the present invention, both as to its structure and operation, can best be understood in reference to the accompanying drawings, in which like reference numerals refer to like parts.

SUMMARY OF THE INVENTION

The present invention provides server-initiated predictive failure analysis (PFA) on disk drives in a RAID system. In contrast to prior art systems where PFA is initiated at the drive-level by drive-level events, the present invention is able to recognize events occurring at the system level, then instruct all the drives in the system to perform a coordinated PFA and report the results of the PFA back to the system.

In one embodiment of the present invention, a method is provided for performing predictive failure analysis (PFA) on one or more disk drives in a server system. The method begins by monitoring the server system at the system level for a PFA triggering event. Next, a PFA initiation command is issued to the one or more disk drives if a PFA triggering event is encountered on the server system. Upon receiving a PFA initiation command from the server, each of the disk drives performs a PFA, and reports any PFA errors back to the server system, if any of the one or more disk drives fails the PFA.

Examples of PFA triggering events include: a rebuild operation on the disk drives, the addition of new disk drives to the server system, suspected handling damage to any of the disk drives in the server system, and a change in usage patterns for the disk drives in the server system.

In another aspect of the present invention, a computer system is provided, having a server. The server incorporates a Predictive Failure Analysis monitor, for detecting system level PFA triggering events and issuing PFA initiation command if a triggering event is detected. The computer system also includes one or more Redundant Array of Independent Disk (RAID) units operably connected to the server. A plurality of disk drives is incorporated within each of the RAID units. Each of the plurality of disks is capable of receiving the PFA initiate command issued by the PFA monitor. Upon receipt of the PFA command, a PFA measurement is triggered within the disk drive.

Examples of PFA triggering events include: a rebuild operation for the plurality of disk drives, the addition of new disk drives to the RAID units, suspected handling damage to the disk drives in the server system, and/or a change in usage patterns for the plurality of disk drives in the server system.

The present invention further provides a Redundant Array of Independent Disks (RAID) having a RAID controller, a predictive failure analysis monitor incorporated within the RAID controller, and a plurality of disks incorporated within the RAID. The PFA monitor is capable of detecting a system level triggering event, and issuing a PFA initiate command if the PFA triggering event is detected. Each of the plurality of disk drives is capable of receiving the PFA command issued by the PFA monitor, the PFA command triggering a PFA measurement within each of the plurality of disk drives.

In one embodiment, the present invention provides a program product having a predictive failure analysis mechanism for monitoring a server system at a system level for a PFA triggering event. The PFA mechanism issues a PFA initiation command to the disk drives if a PFA triggering event is encountered on the server system, performs PFA on the disk drives, and reports any PFA errors to the server system if any of the disk drives fails the PFA. The program product further includes computer-readable signal bearing media bearing the PFA mechanism. The computer-readable signal bearing media may comprise recordable or transmission media.

DETAILED DESCRIPTION OF THE PREFERRED EMBODIMENTS

Figure 1:
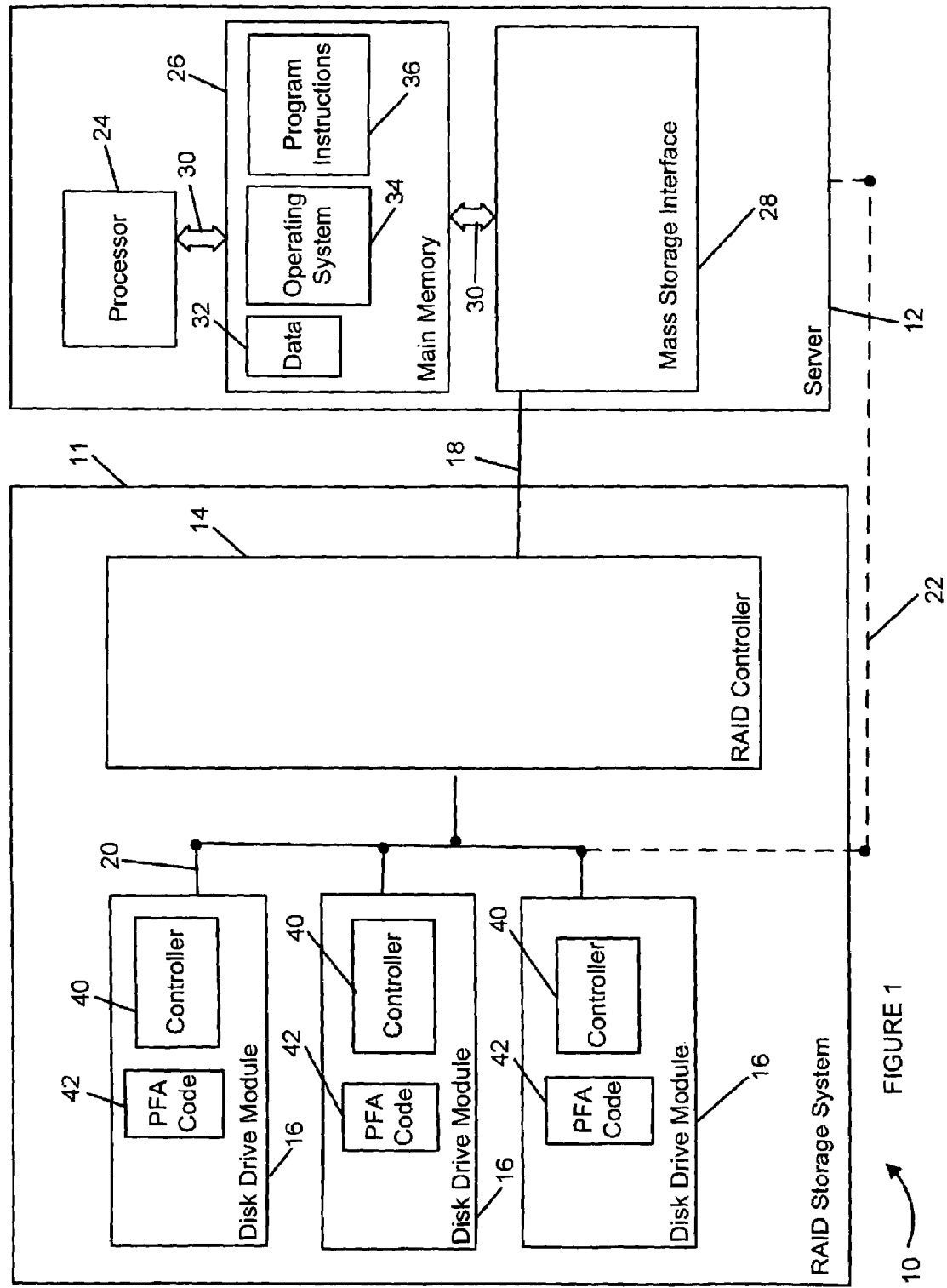
FIG. 1 is a block diagram of a computer system in accordance with a preferred embodiment of the present invention.

Turning to the Drawings, wherein like numbers denote like parts throughout the several views, FIG. 1 is a block diagram of a computer system 10 according to a preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope and spirit of the present invention.

Computer system 10 includes a RAID storage system 11 coupled to a computer server 12 via an interface 18. RAID storage system 11 includes a plurality of Disk Drive Modules (DDMs) 16 attached to a RAID controller 14 via a bus 20. In a preferred embodiment, bus 20 is a SCSI bus, but several alternative bus types may be utilized (e.g., Fibre Channel) and still remain within the scope and spirit of the present invention. In one embodiment, server 12 may also have a direct connection to DDMs 16 via interface path 22, bypassing RAID controller 14.

Server 12 comprises a processor 24, a main memory 26, and a mass storage interface 28. These system components are interconnected through the use of a system bus 30. Mass storage interface 28 is used to connect server 12 to RAID controller 14. Main memory 26 in accordance with the preferred embodiment contains data 32, an operating system 34, and program instructions 36 for monitoring/triggering predictive failure analysis (PFA). Program instructions 36 monitor server 12 at the system level for events which will trigger a PFA. Examples of these events include, but are not limited to: rebuild operations, the addition of new DDMs 16 to the computer system 10, suspected handling damage to any of the DDMs in the computer system 10, and a change in usage patterns for any of the DDMs in the computer system. If such a triggering event is detected, a PFA initiation command is issued to the DDMs 16, either indirectly via the RAID controller 14 or directly via interface path 22.

The present invention is distinguishable over prior art in that the PFA is initiated at the server-level rather than at the drive-level. In this way, PFA can be advantageously triggered when events occur beyond the scope of the disk drive itself. In addition to monitoring events at the system-level as shown in the present invention, it is contemplated that DDMs 16 may also continue to sense drive-level conditions that will force a PFA. Examples of such events include, but are not limited to, head flying height, hard error rates, soft error rates, vibration, and disk run out checks.

Processor 24 may be constructed from one or more microprocessors and/or integrated circuits. Processor 24 executes program instructions 36 stored in main memory 26. Main memory 26 stores programs and data that processor 24 may access. When computer system 10 starts up, processor 24 initially executes the program instructions that make up operating system 34. Operating system 34 is a sophisticated program that manages the resources of computer system 10. Some of these resources are processor 24, main memory 26, mass storage interface 28, and system bus 30.

Although server 12 is shown to contain only a single processor 24 and a single system bus 30, those skilled in the art will appreciate that the present invention may be practiced using a computer system that has multiple processors and/or multiple buses. At this point, it is important to note that while the present invention has been and will continue to be described in the context of a fully functional computer system, those skilled in the art will appreciate that the present invention is capable of being distributed as a program product in a variety of forms, and the present invention applies equally regardless of the particular type of signal bearing media used to actually carry out the distribution. Examples of suitable signal bearing media include: recordable type media such as floppy disks and CD ROM, and transmission type media such as digital and analog communications links.

During normal operation, when a read/write command is issued by server 12 to RAID storage system 11, RAID controller 14 dispatches the command to DDMs 16. Even though RAID storage system 11 contains multiple DDMs 16, RAID storage system 11 appears to server 12 as a single storage unit. Depending upon the type of RAID employed within the controller, RAID controller 14 dispatches the storage operation for the single command across the plurality of DDMs 16. In one embodiment, data can be striped across DDMs 16 to give more access speed. Alternatively, data can be mirrored across multiple DDMs 16 for data security. In yet another embodiment, RAID controller 14 stripes data across DDMs 16 and also maintains parity information on the DDMs.

DDMs 16 are the disk drives on which data is magnetically recorded, and from which data is read, by one or more heads, which are not separately shown. In one embodiment, DDMs 16 include a controller 40 for controlling operation of the DDMs. Although controller 40 is shown integrated with DDM 16, controller 40 may also be physically separate from the DDM. Associated with controller 40 is predictive failure analysis code 42 which programs controller 40 to perform predictive failure analysis in accordance with aspects of the invention. Predictive failure analysis code 42 may, for example, be stored in a memory device such as an EEPROM or another similar storage device (not separately shown) associated with the controller 14. In one embodiment of the present invention, predictive failure analysis results are logged in the reserved area of the DDM 16.

In an alternative embodiment of the present invention, system level monitoring, as described in server 12 above, can be performed by the RAID controller 14, rather than by the server 12. In other words, RAID controller 14 monitors system level conditions (e.g., rebuild operations, DDM usage patterns, equipment changes, suspected damage), initiates drive-level PFA measurements, and monitors PFA results. In order to do this, RAID controller possesses the same types of design elements outlined earlier for server 12, namely: a processor, a main memory, and a mass storage interface (not illustrated).

Figure 2:
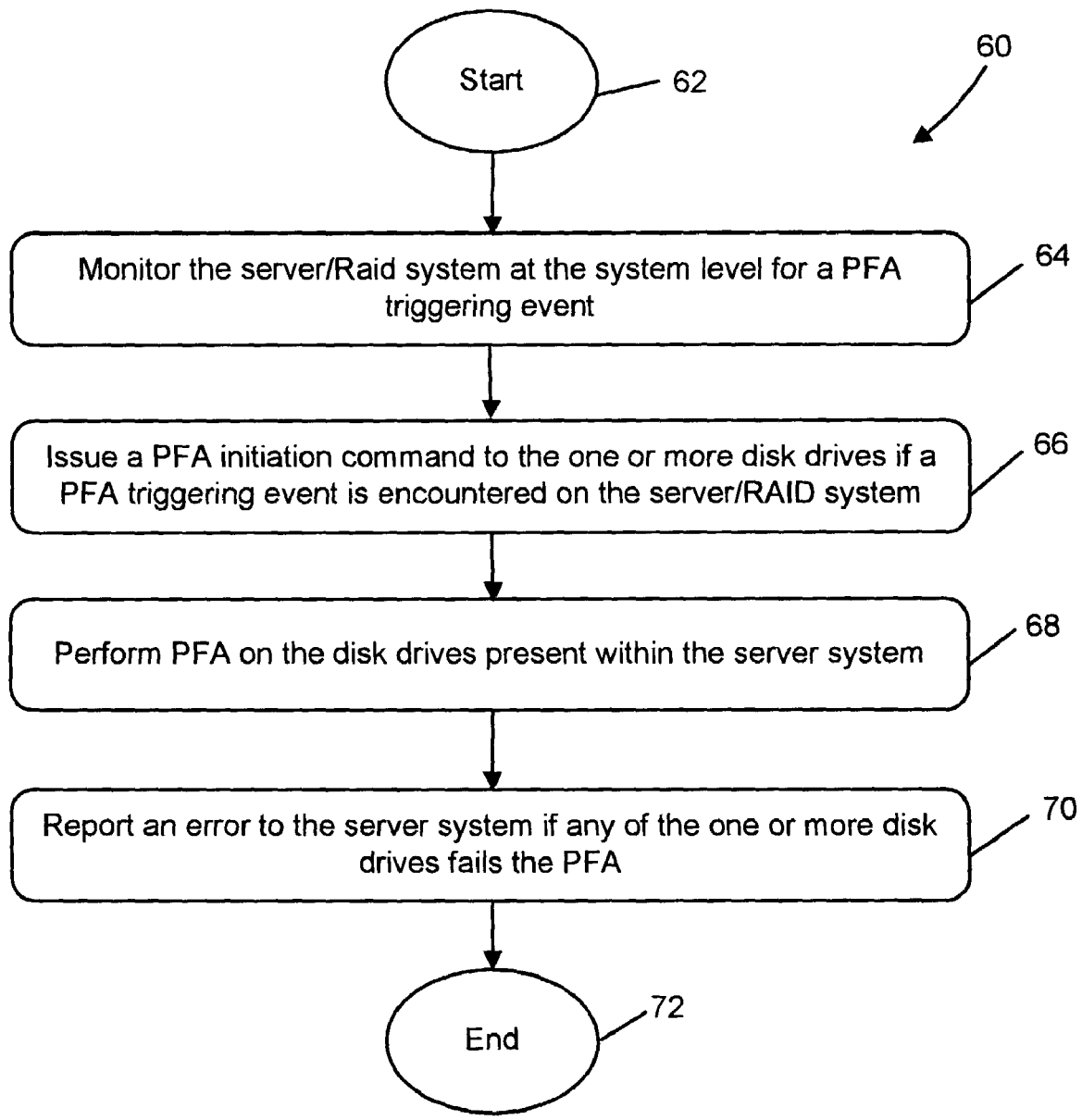
FIG. 2 is a high level flow diagram of a method for performing predictive failure analysis (PFA) on one or more disk drives in a server system.

FIG. 2 is a high level flow diagram of a method for performing predictive failure analysis (PFA) on one or more disk drives in a server system, shown generally at 60. The method begins at block 62. At block 64, a server/RAID system is monitored at the system level for a PFA triggering event. As described previously, such an event may include a RAID rebuild operation, sensing that the server/RAID system has not been in use for some time, the addition of new or used DDMs to the server/RAID system, suspect handling damage of the server/RAID system, and/or a change in the usage pattern of the server/RAID system.

At block 66, the server/RAID system issues a PFA command to the one or more disk drives (i.e., DDRs) present within the system if a PFA triggering event is encountered on the server/RAID system. If the monitoring operation of block 64 detects a PFA triggering event, the monitor sends a signal to the DDMs, indicating that the DDMs should initiate a PFA operation. At block 68, a PFA is performed on the disk drives present within the server system. At block 70, if the PFA measurements indicate that a problem exists, an error is reported to the server/RAID system.

Figure 3:
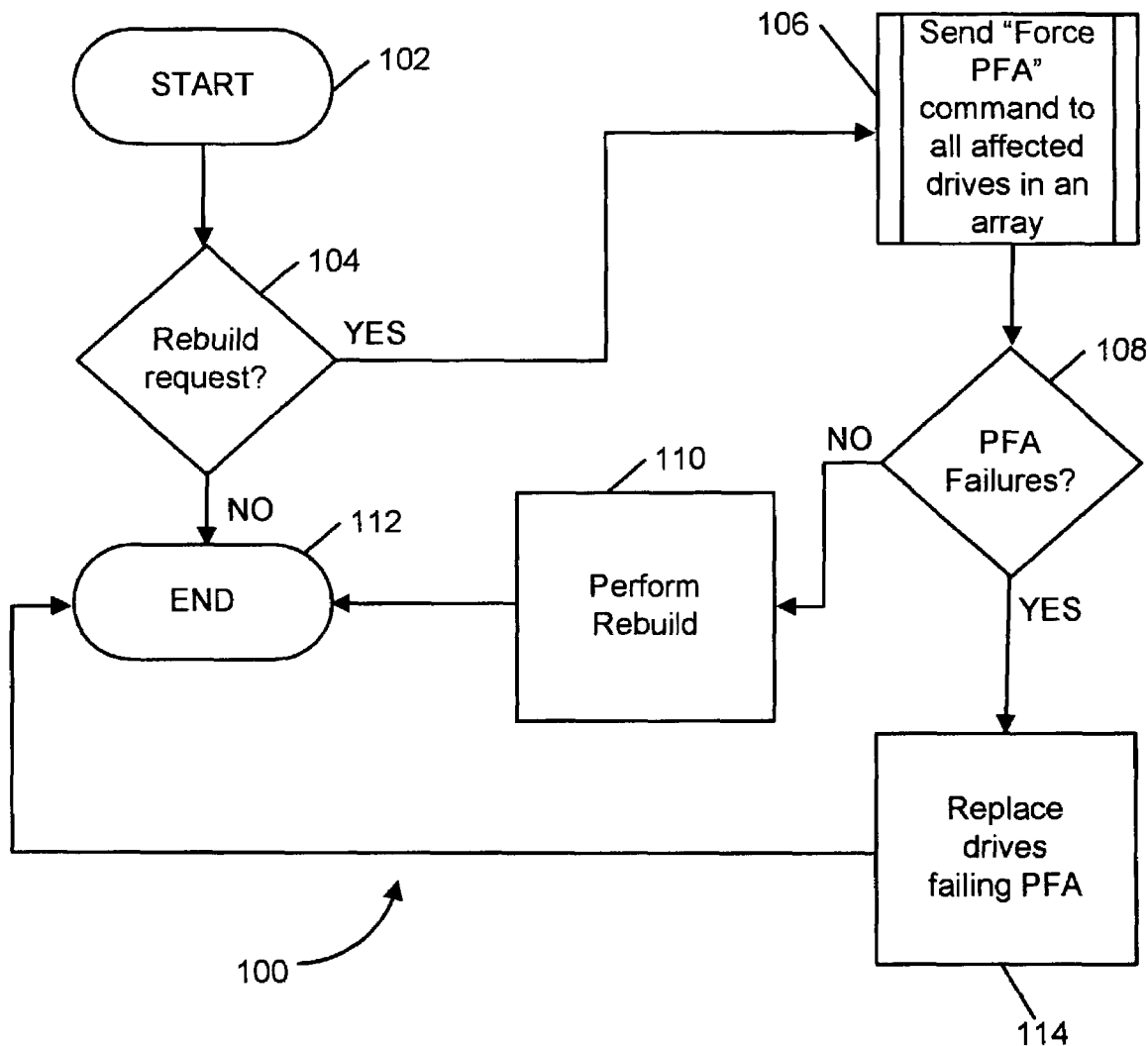
FIG. 3 is a flow diagram showing a response at the RAID level if a rebuild request is issued.

FIG. 3 is a flow diagram showing a response at the RAID level if a rebuild request (i.e., a PFA triggering event) is issued to RAID controller 14, shown generally at 100. As stated previously, RAID controller 14 may be used to initiate drive-level PFA measurements and monitor PFA results.

After starting the process (shown at block 102), a check is made to see if a rebuild request is pending, as shown at block 104. If a rebuild is planned, all of the disk drives (i.e., DDMs) are requested to perform a PFA check via a "force PFA" command sent by the RAID controller to the drives, as shown at block 106. At block 108, it is determined if any PFA errors exist. If no PFA errors are received, the rebuild takes place (block 110), and the process ends, at block 112. If one or more drives show a PFA failure (determined via the return codes provided by the drive), then those drives are replaced, (block 114), and the process ends, at block 112.

Additional modifications may be made to the illustrated embodiments without departing from the spirit or scope of the invention. Therefore, the invention lies in the claims hereinafter appended.

What is claimed is:

1. A method for performing predictive failure analysis (PFA) on one or more disk drives in a server system, the method comprising the steps of:

monitoring the server system at the system level for a PFA triggering event;

issuing a PFA initiation command to the one or more disk drives if a PFA triggering event is encountered on the server system;

performing PFA on the one or more disk drives; and reporting a PFA error to the server system if any of the one or more disk drives fails the PFA.

2. The method of claim 1, wherein the PFA triggering event is a rebuild operation for the one or more disk drives.

3. The method of claim 1, wherein the PFA triggering event is the addition of new disk drives to the server system.

4. The method of claim 1, wherein the PFA triggering event is suspected handling damage to the one or more disk drives in the server system.

5. The method of claim 1, wherein the PFA triggering event is a change in usage patterns for the one or more disk drives in the server system.

6. The method of claim 1, wherein the method further includes the step of logging the results of the PFA in a reserved area of the one or more disk drives.

7. A computer system, comprising:
a server;
a Predictive Failure Analysis (PFA) monitor incorporated within the server, the PFA monitor capable of detecting a system level PFA triggering event, and issuing a PFA initiate command if a PFA triggering event is detected;
one or more Redundant Array of Independent Disk (RAID) units operably connected to the server; and
a plurality of disk drives incorporated within each of the one or more RAID units, wherein each of the plurality of disk drives is capable of receiving the PFA initiate command issued by the PFA monitor, the PFA command triggering a PFA measurement within each of the plurality of disk drives.

8. The computer system of claim 7, wherein the system level PFA triggering event is a rebuild operation for the plurality of disk drives.

9. The computer system of claim 7, wherein the system level PFA triggering event is the addition of new disk drives to the one or more RAID units.

10. The computer system of claim 7, wherein the system level PFA triggering event is suspected handling damage to the plurality of disk drives in the server system.

11. The computer system of claim 7, wherein the PFA triggering event is a change in usage patterns for the plurality of disk drives in the server system.

12. The computer system of claim 7, wherein each of the RAID units includes a RAID controller.

13. The computer system of claim 7, wherein the PFA command is routed from the PFA monitor of the server to the plurality of disks via the RAID controller.

14. A Redundant Array of Independent Disks (RAID), comprising:
a RAID controller;
a predictive failure analysis (PFA) monitor incorporated within the RAID controller, the PFA monitor capable of detecting a system level triggering event, and issuing a PFA initiate command if the PFA triggering event is detected; and
a plurality of disk drives incorporated within the RAID, wherein each of the plurality of disk drives is capable of receiving the PFA command issued by the PFA monitor, the PFA command triggering a PFA measurement within each of the plurality of disk drives.

15. The RAID of claim 14, wherein the system level PFA triggering event is a rebuild operation for the plurality of disk drives.

16. The RAID of claim 14, wherein the system level PFA triggering event is the addition of new disk drives to the RAID.

17. The RAID of claim 14, wherein the system level PFA triggering event is suspected handling damage to the one or more disk drives in the RAID.

18. The RAID of claim 14, wherein the PFA triggering event is a change in usage patterns for the one or more disk drives in the RAID.

19. A program product, comprising:
a predictive failure analysis (PFA) mechanism that monitors a server system at a system level for a PFA triggering event, issues a PFA initiation command to one or more disk drives if a PFA triggering event is encountered on the server system, performs PFA on the one or more disk drives, and reports a PFA error to the server system if any of the one or more disk drives fails the PFA, and
a computer-readable storage medium bearing the PFA mechanism.

* * * * *

UNITED STATES PATENT AND TRADEMARK OFFICE
CERTIFICATE OF CORRECTION

PATENT NO.       : 7,631,067 B2                              Page 1 of 1
APPLICATION NO.  : 10/176205
DATED            : December 8, 2009
INVENTOR(S)      : Gordon James Smith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1777 days.

Signed and Sealed this

Second Day of November, 2010

David J. Kappos
*Director of the United States Patent and Trademark Office*